United States Patent
Narnakaje Venugopala et al.

(10) Patent No.: US 11,706,080 B2
(45) Date of Patent: Jul. 18, 2023

(54) PROVIDING DYNAMIC SERVICEABILITY FOR SOFTWARE-DEFINED DATA CENTERS

(71) Applicant: VMWARE, INC., Palo Alto, CA (US)

(72) Inventors: Prabhakara Rao Narnakaje Venugopala, Bangalore (IN); Shubham Verma, Bangalore (IN); Sindhu Hanji Basavaraju, Bangalore (IN)

(73) Assignee: VMWARE, INC.

( * ) Notice: Subject to any disclaimer, the term of this patent is extended or adjusted under 35 U.S.C. 154(b) by 513 days.

(21) Appl. No.: 16/102,772

(22) Filed: Aug. 14, 2018

(65) Prior Publication Data
US 2019/0379576 A1    Dec. 12, 2019

(30) Foreign Application Priority Data
Jun. 7, 2018  (IN) .............................. 201841021360

(51) Int. Cl.
| | |
|---|---|
| *H04L 12/24* | (2006.01) |
| *H04L 41/0654* | (2022.01) |
| *H04L 41/0631* | (2022.01) |
| *H04L 41/0266* | (2022.01) |
| *H04L 43/103* | (2022.01) |
| *H04L 43/08* | (2022.01) |

(Continued)

(52) U.S. Cl.
CPC ...... *H04L 41/0654* (2013.01); *H04L 41/0266* (2013.01); *H04L 41/0631* (2013.01); *H04L 41/16* (2013.01); *H04L 43/028* (2013.01); *H04L 43/08* (2013.01); *H04L 43/103* (2013.01)

(58) Field of Classification Search
CPC . H04L 12/14; H04L 41/0654; H04L 41/0266; H04L 41/0631; H04L 41/16; H04L 43/028; H04L 43/04; H04L 43/06; H04L 43/08; H04L 43/103; H04L 41/40; H04L 41/0895; H04L 41/0893; G06F 2009/4557; G06F 11/3476; G06F 9/45558
See application file for complete search history.

(56) References Cited

U.S. PATENT DOCUMENTS

| | | | |
|---|---|---|---|
| 7,693,983 B1 * | 4/2010 | Gupta ..................... | H04L 12/14 709/224 |
| 10,447,546 B1 * | 10/2019 | Guo ................... | G06Q 10/0639 |
| 10,536,355 B1 * | 1/2020 | Cao ........................ | H04L 43/20 |

(Continued)

*Primary Examiner* — Chirag R Patel
(74) *Attorney, Agent, or Firm* — Clayton, McKay & Bailey, PC

(57) ABSTRACT

Examples described herein include systems and methods for providing dynamic serviceability for a software-defined data center ("SDDC"). An example method can include collecting data-center metrics from a management service that monitors the SDDC, filtering the data-center information based on a predetermined list of metrics provided by a partner entity, and translating the filtered data-center information into a partner-specific format requested by the partner entity. The example method can also include generating metadata associated with the translated data-center information and transmitting the metadata and translated data-center information to a partner site associated with the partner entity. If the partner site is not available, the method can include transmitting the information to a partner-accessible storage location and, when the partner site becomes available, identifying the storage location and failed attempt to deliver the information.

20 Claims, 3 Drawing Sheets

(51) Int. Cl.
*H04L 43/028* (2022.01)
*H04L 41/16* (2022.01)

(56) References Cited

U.S. PATENT DOCUMENTS

| | | | | |
|---|---|---|---|---|
| 2015/0082432 A1* | 3/2015 | Eaton | ................... | G06F 9/5072 |
| | | | | 726/23 |
| 2015/0281453 A1* | 10/2015 | Maturana | ........... | G05B 23/0213 |
| | | | | 379/265.12 |
| 2016/0057027 A1* | 2/2016 | Hinrichs | ............. | H04L 41/5022 |
| | | | | 709/224 |
| 2017/0134247 A1* | 5/2017 | Hoja | ....................... | H04L 43/10 |

* cited by examiner

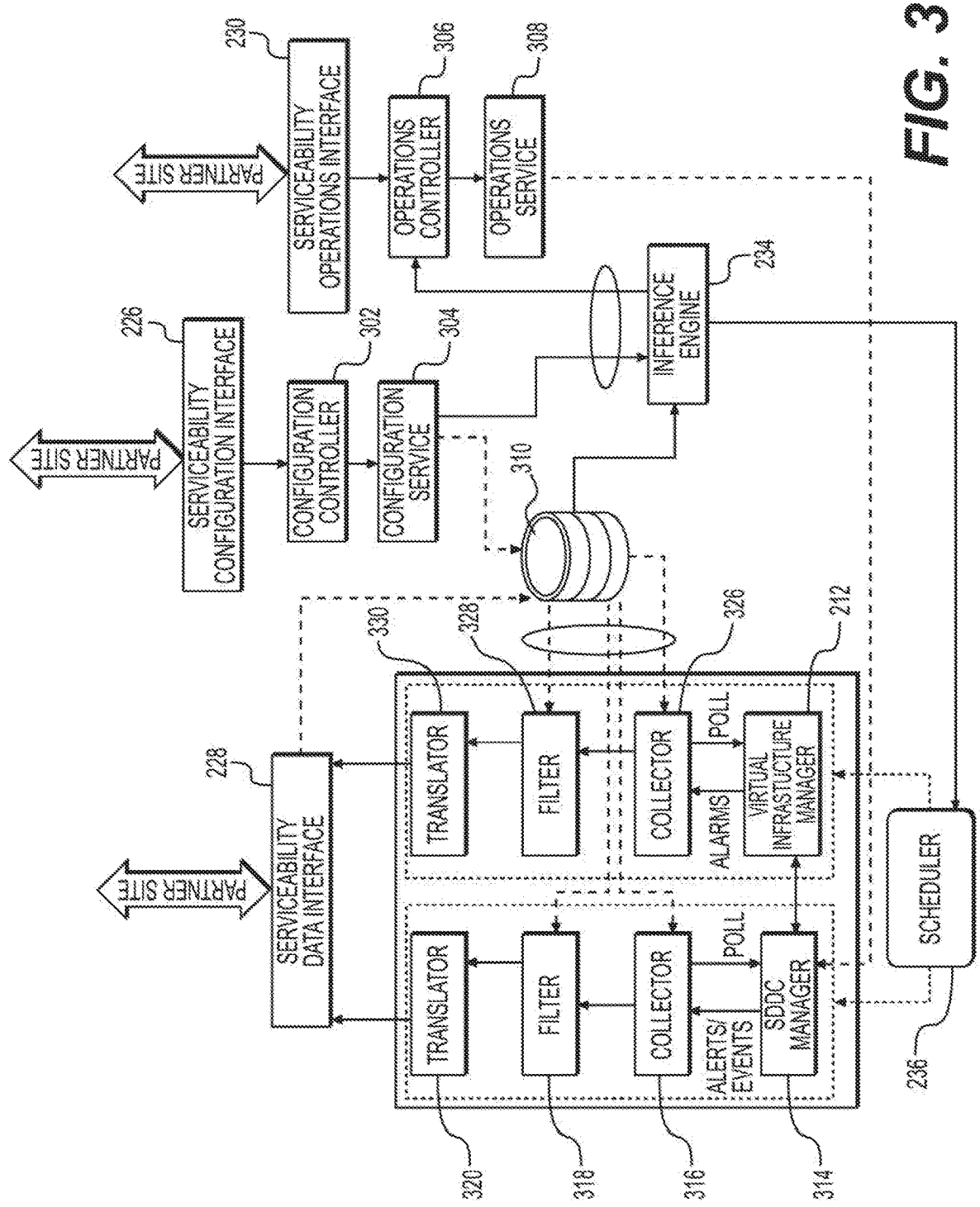

PROVIDING DYNAMIC SERVICEABILITY FOR SOFTWARE-DEFINED DATA CENTERS

RELATED APPLICATIONS

Benefit is claimed under 35 U.S.C. 119(a)-(d) to Foreign Application Serial No. 201841021360 filed in India entitled "PROVIDING DYNAMIC SERVICEABILITY FOR SOFTWARE-DEFINED DATA CENTRES", on Jun. 7, 2018, by VMware, Inc., which is herein incorporated in its entirety by reference for all purposes.

BACKGROUND

Traditional data centers typically contain multiple servers, each of which can be limited to using its own processor(s) and memory along with a shared, central storage location. Using virtualization techniques, these servers can pool their computing, memory, and storage resources while each executing multiple virtual machines, increasing the output and utilization of the data center. The system can utilize off-the-shelf components with direct-attached storage, providing an administrator with the ability to plug and play into a pool of similar components. An administrator can access both the hardware and software resources through a single platform. A data center utilizing a fully software-defined infrastructure, including virtualized computing, storage, and networking, can be considered a "hyper-converged infrastructure" ("HCI") or "software-defined data center" ("SDDC").

While SDDCs provide many benefits, many of the current solutions fail to provide adequate serviceability tools. An SDDC may utilize hardware and firmware from various partners, resulting in a variety of serviceability needs. Many SDDCs lack the ability to (1) provide a proactive and vendor-agnostic service, (2) associate serviceability with maintenance by locking or "muting" a resource to avoid spurious issues, (3) automatically configure telemetry processing pipelines to suit a partner's needs, (4) automatically detect and fix problems, (5) provide an interface for partners to implement patches or other fixes, and (6) provide multi-site SDDC support for serviceability.

As a result, a need exists for systems and methods for providing improved, dynamic serviceability for data-centers, including SDDCs.

SUMMARY

Examples described herein include systems and methods for providing dynamic serviceability for an SDDC. An example method includes collecting data-center metrics from a management service that monitors the SDDC. The data-center metrics can include statistics, events, alarms, and alerts generated by software or hardware components of the SDDC.

The example method can also include filtering the data-center information based on a predetermined list of metrics provided by a partner entity. As used herein, a "partner entity" or "partner" can be an organization, company, group, individual, or service that is responsible for managing service requests associated with an SDDC or a portion of an SDDC.

The example method can also include translating the filtered data-center information into a partner-specific format requested by the partner entity. For example, the partner entity can request the data-center information to be provided in the form of a service request. The service-request format can be specific to the partner entity and provided in advance. The step of translating can include formatting the filtered data-center information such that it matches a service-request format specific to the partner entity.

The example method can include generating metadata associated with the translated data-center information. The metadata can include any type of information that describes or is relevant to the translated information. For example, it can describe the time or times at which the information was collected, the type of filtering or translation applied to the information, and the size of the data embodying the information. The example method can include transmitting the metadata and translated data-center information to a partner site associated with the partner entity.

In one example, the method can also include, in response to determining that the partner site is unavailable, forwarding the metadata and translated data-center information to a partner-accessible storage location. The storage location can be a cloud storage location, for example. The method can also include determining that the partner site has recovered. In response, the method can include generating an alert regarding downtime of the partner site and identifying the destination of the metadata and translated data-center information. The partner entity can use that information to retrieve the information from the storage location.

The collection of data-center metrics can be performed according to a poll time. The poll time can be dynamically set by an inference engine based on settings provided by the partner entity. For example, the partner entity can specify conditions necessitating more frequent (or less frequent) polling times, and the inference engine can recognize those conditions and implement the relevant polling time.

The stages of the example method can be performed based on a least one rule supplied by the partner entity through a serviceability configuration interface and enforced by an inference engine. The inference engine can be a rules engine that incorporate artificial intelligence, such as by executing machine-learning algorithms.

The example method can also include receiving a response from a partner entity through a serviceability operations interface and implementing a solution at the SDDC, based on the received response, without manual intervention. For example, an inference engine can detect a problem, interpret instructions related to solving that problem, and carry out the instructions without requiring an administrator's input. The inference engine can execute a machine-learning model provided by the partner entity to make decisions on actions to take, such as restarting a service or system that has produced an error.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 3 is system diagram of an example serviceability module.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for providing dynamic serviceability for an SDDC. Although the examples described herein refer to an SDDC, the systems and methods equally can be applied to other types of data-centers. Serviceability of these data-centers, including SDDCs, can be provided by collecting information regarding the hardware and software components of the data-center, filtering and formatting the information to suit a particular partner entity's needs, and providing the filtered and formatted information to the partner entity. Some example systems can utilize an inference engine to automatically diagnose issues and implement fixes without requiring manual intervention.

Figure 1:
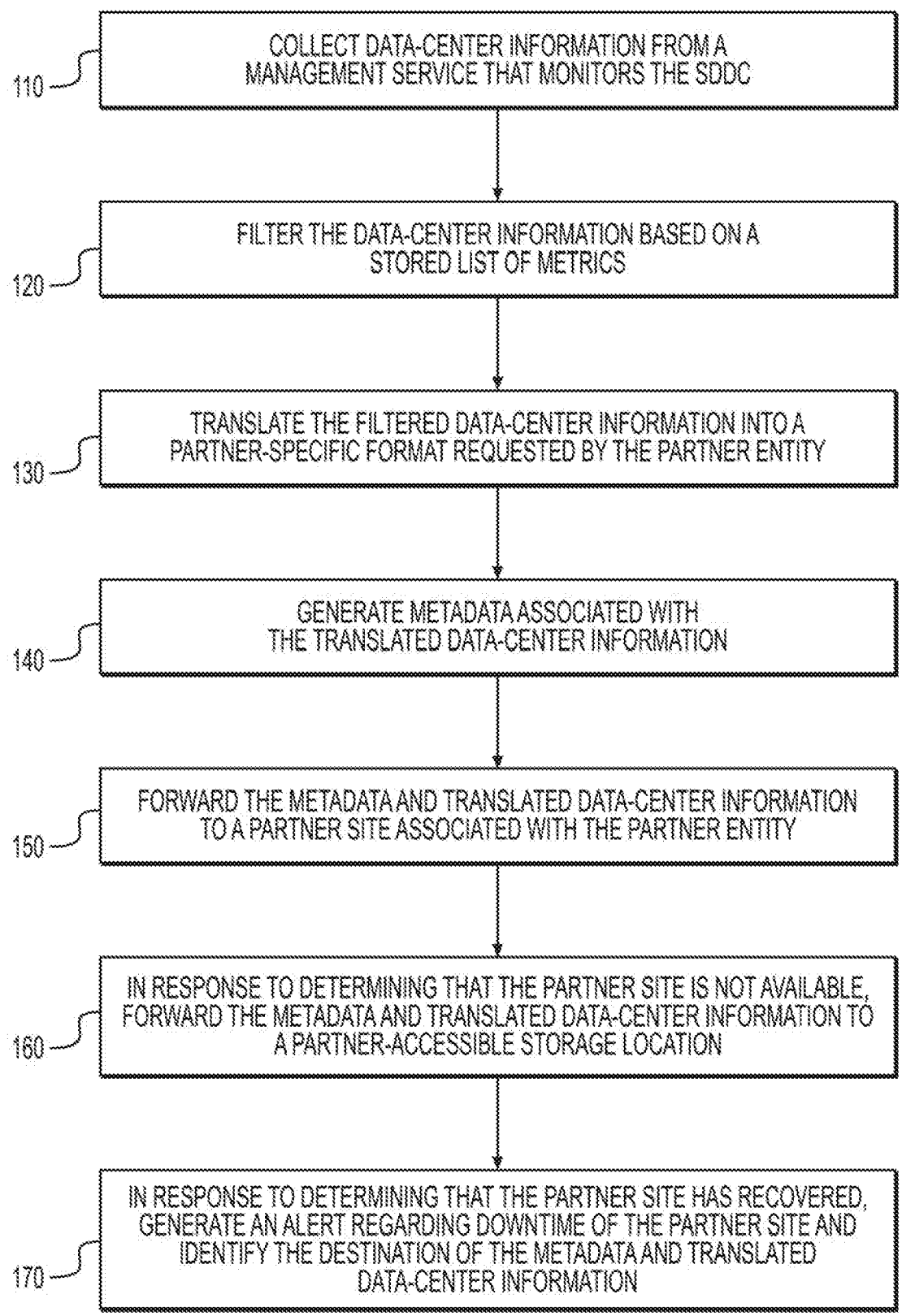
FIG. 1 is a flowchart of an exemplary method for providing dynamic serviceability for an SDDC.
Figure 2:
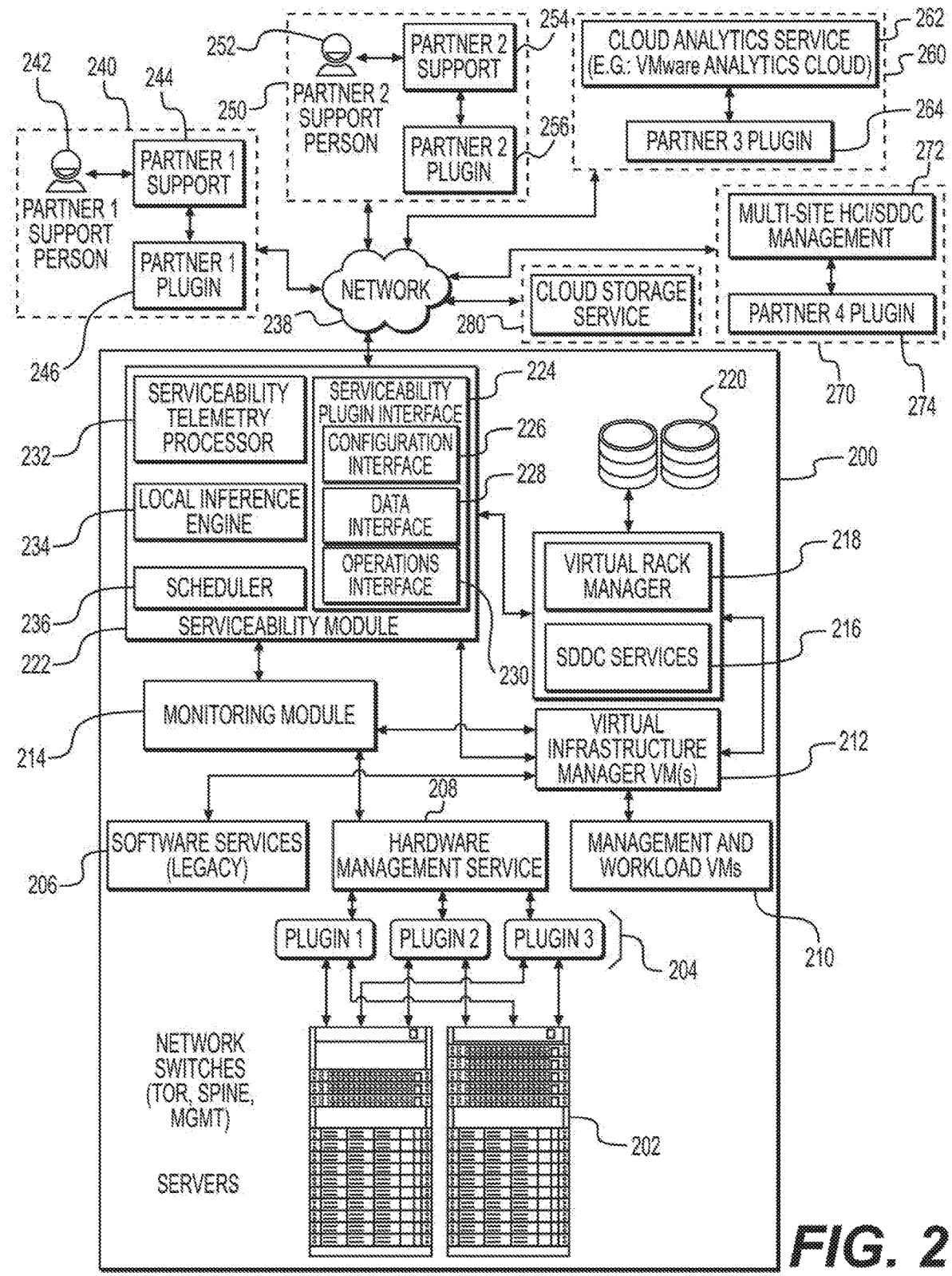
FIG. 2 is a system diagram of an SDDC that provides information to various destinations.

FIG. 1 provides a flowchart of an example method for providing dynamic serviceability for an SDDC. FIG. 2 provides a system diagram of an SDDC that provides information to various destinations. FIG. 3 provides system diagram an example serviceability module that can be implemented in an SDDC to provide dynamic serviceability.

Turning to the example method of FIG. 1, stage 110 can include collecting data-center information from a management service that monitors the SDDC. The data-center information can include any information regarding the hardware and software components that make up the SDDC. With respect to a particular hardware component, for example, the data-center information can include an identification of the type of hardware component, its manufacturer, build date, installation date, processor specification, memory specification, firmware, software, operating system ("OS") type and version, device identification number, workload, number of supported virtual machines ("VMs"), configurations, logs, and any other relevant information about the hardware component.

Software components can also be described by the data-center information. For example, with respect to a particular software component, the data-center information can include the current software version, previous software version, previous patches, available updates, hardware compatibility, compatibility with other software components or with partner entity support sites, required resources to ensure performance, number and types of supported or currently running VMs, configuration information, logs, and any other relevant information about the software component.

The data-center information can also include information regarding events, alerts, and alarms for any component in the SDDC. An event can be a record of a user action or system action that occurs on an object in a server, host, or other component of the SDDC. Actions that might be recorded as events include but are not limited to: a license key expiring, a VM being powered on or off, a user logging into or out of a VM, and a host connection being lost or reestablished.

Data-center information regarding an event can include details about the event, such as who or what generated it, when it occurred, and what type of event it is. In one example, there are three types of events: an information event, a warning event, and an error event. An information event can simply provide information that does not require a response, such as, for example, a host connection being established or reestablish. A warning event can provide a warning but not necessarily indicate that immediate action is required. For example, a warning event can include a warning that a host is operating at over 90% capacity and may exceed capacity in the near future. An error event can provide information regarding an error that needs to be corrected, such an indication that a host has unexpected powered down or lost connection, or that a license has expired and caused a host to cease operations.

Alarms can be notifications activated in response to an event, a set of conditions, or the state of an inventory object. An alarm can include various types of information that are all considered "data-center information." For example, an alarm can include a name and description that provides an identification of the source of the alarm. An alarm can also include an alarm type that defines the type of object that is relevant to the alarm. It can include triggers that define the event, condition, or state that triggers the alarm and defines the notification severity.

An alarm can further include tolerance thresholds that provide additional restrictions on condition and state triggers thresholds that must be exceeded before the alarm is triggered. It can also include actions that define operations to occur in response to a triggered alarm. Actions can be predefined and specific to inventory object types, in some examples. Alarms can provide severity information according a severity scheme that defines levels of severity. For example, an alarm can display as green to indicate normal operation, yellow to indicate a "warning" state, and red to indicate an "alert" state. Alarms can be initiated by a virtual infrastructure manager, which is described with respect to FIG. 2.

In addition to events and alarms, the data-center information can also include alerts. An alert can be a record of a fault detected in the system. For example, an alert can be based on an alarm that describes a system failure. An SDDC manager—described in more detail with respect to FIG. 3—can generate an alert based on a determination that a fault has occurred. In some examples, a single occurrence can cause both an alarm and an alert to be generated by the system. The alarm can be generated by a virtual infrastructure manager, while the alert can be generated by an SDDC manager. In some examples, either or both of the virtual infrastructure manager and SDDC manager can generate either or both of the alarm and alert, as desired.

At stage 120, the system can filter the data-center information based on predetermined rules. The predetermined rules can be provided by a partner entity in some examples. Because the collection of data-center information can be wide ranging, a large amount of data can be gathered and needs to be sorted into usable information. For example, in some circumstances duplicate events, alarms, or alerts can be generated based on a single event. This can occur when multiple detection components, such as a virtual infrastructure manager and an SDDC manager, are monitoring the same system component. The predetermined rules can indicate that the duplicate events, alarms, and alerts be removed from the data-center information. The rules can also recognize events, alarms, and alerts that are related to one another, and combine them to form a single telemetry element.

The filtering at stage 120 can also be performed based on a predetermined list of metrics provided by a partner entity.

For example, a partner entity may not want to receive any alarms that are given a green color code (indicating normal operation of a component). In that example, the partner entity's predetermined list can include yellow- or red-coded alarms. When a green-coded alarm is present in the data-center information, the filtering process can remove the information related to that alarm based on the predetermined list. Similar rules or indications can be provided, either by the partner entity or otherwise, dictating the type of filtering to be performed at this stage. For example, filtering can further include purging irrelevant information or grouping related information items together.

The various components in an SDDC can be serviced by multiple different partner entities, each of which can use their own processes and systems for handling issues that arise in the SDDC. Each partner entity can specify a particular format for data-center information it receives. For example, a partner entity can specify that the data-center information should be formatted to include a field specifying the component at issue, followed by a field specifying the type of event, alarm, or alert relevant to that component, followed by the specifications of that component, and so on. As explained with respect to FIGS. 2 and 3, a partner entity can provide formatting instructions through a serviceability configuration interface that provides a mechanism for automatically receiving and implementing such instructions at the SDDC. These formats can be arbitrarily chosen by a partner entity and can vary from one partner entity to another.

Stage 130, therefore, can include translating the filtered data-center information into a partner-specific format requested by the partner entity. This stage can include identifying the relevant partner entity implicated by the data-center information at issue, obtaining instructions associated with that partner entity regarding the requested format of information, and formatting the information to match the requested format.

Even after filtering and translating, the translated data-center information is not necessarily provided directly to the relevant partner entity. Instead, the translated data-center information can be packaged and transmitted to the partner entity as a batch. Stage 140 can include generating any necessary metadata associated with the translated data-center information to prepare it for transmission to the partner entity. This can include, for example, generating metadata indicating the dates and times covered by the data-center information, the filtering or translating rules applied to the data-center information, or any other relevant information describing the translated data-center information.

The metadata and translated data-center information can be transmitted to the relevant partner entity at stage 150. This stage can include identifying a destination associated with a partner entity and ensuring that the partner entity matches a partner entity previously associated with the data-center information. The stage can further include attempting to connect a partner site associated with the partner entity, and after connecting, attempting to upload the batched metadata and translated data-center information. Stage 150 need not include successfully transmitting the batched data to the partner entity. In the event of an unsuccessful transmission, the method can continue to stage 160.

Stage 160 can be performed in response to determining that the partner site is not available. In that case, stage 160 can include forwarding the metadata and translated data-center information to a partner-configured storage location. The partner-configured storage location can be a cloud storage location configured by, and accessible to, the partner entity. The partner entity can then retrieve the metadata and translated data-center information when it can do so.

To alert the partner site that the transmission was unsuccessful and that the metadata and translated data-center information is stored at a partner-configured storage location, stage 170 can be carried out. Stage 170 can include generating an alert regarding downtime of the partner site. For example, the alert can indicate the time of any attempts to transmit the data to the partner entity site. The alert can also indicate the size of the attempted transmission and other identifying information. Additionally, stage 170 can include identifying the destination of the metadata and translated data-center information. This can include, for example, identifying a cloud storage location at which the information is stored. The partner entity can utilize this information to retrieve the information and resolve any issues with the partner site that may be needed.

FIG. 2 provides an illustration of an example system capable of carrying out the method of FIG. 1 and other methods described herein. FIG. 2 depicts an SDDC 200 that can provide data-center information to various destinations through a network 238. The destinations can include, for example, a first partner entity 240, second partner entity 250, cloud analytics service 260, multi-site SDDC management location 270, and a cloud storage service 280. These are discussed in more detail below.

The SDDC 200 can include any number of physical servers 202 that provide functionality for storing, retrieving, and transmitting information. Each physical server 202 can include, for example, one or more processors, one or more storage drives, and memory. The servers 202 can be traditional servers in one example. In another example, one or more servers 202 are HCI-capable and include direct-attached storage. The servers 202 can be off-the-shelf components capable of providing a plug-and-play solution to creating a pool of server resources. For example, a server 202 can utilize its own direct-attached storage as well as the direct-attached storage of other servers 202. The storage, backup, and retrieval processes can be software-controlled processes. The servers 202 can each run multiple VMs that are also software controlled. Although referred to as "servers," the servers 202 can include any SDDC hardware, including servers, switches, gateways, routers, bridges, modems, hubs, repeaters, or other networking hardware.

The servers 202 can communicate with any number of hardware plugins 204 that interact with the physical hardware of the servers 202. The hardware plugins 204 can provide a bridge to a hardware management service ("HMS") 208 and allow the HMS 208 to manage the servers 202. For example, the HMS 208 can provide functions required for discovering, bootstrapping, and monitoring the servers 202 and other hardware. In some examples, the hardware plugins 204 can be provided by a vendor or manufacturer of a server 202 component. In some examples, the hardware plugins 204 can be provided by the entity providing or managing the SDDC. The plugins 204 can allow the HMS 208 to access all servers and switches 202 in the system and send and receive information to and from the servers and switches 202.

The HMS 208 can provide information obtained from the plugins 204 to a monitoring module 214. The monitoring module 214 can include a variety of agents that implement different mechanisms to collect data. The agents can be generated based on code executing on a computing device. In some examples, an ESXi agent can use a Common Information Model ("CIM") to collect data, a fabric agent can use Storage Management Interface Specifications ("SMI-S") to collect data, and a storage array agent can use either SMI-S or an Application Programming Interface ("API") such as VMWARE's API for Storage Awareness ("VASA"). The monitoring module can communicate with both a serviceability module 222 and a virtual infrastructure manager(s) 212.

The virtual infrastructure manager 212 can be a virtualization platform, such as VMWARE's vSPHERE, that allows a manager to run, manage, connect, and secure virtual resources in the system. In some examples, the virtual infrastructure manager 212 includes multiple virtualization platforms, such as multiple instances of vSPHERE. The virtual infrastructure manager 212 can collect events, alarms, and alerts at the cluster level. In some examples, the virtual infrastructure manager 212 can collect hardware-level alerts, but typically those hardware-level alerts are not visible to the virtual infrastructure manager 212. The virtual infrastructure manager 212 can be one source of events, alarms, and alerts that are processed by the serviceability module 222.

The virtual infrastructure manager 212 can also communicate with legacy software services 206 and management and workload VMs 210. The legacy software services 206 can be used when, for example, a partner entity wishes to rely on its own software solutions for collecting serviceability information. For example, a partner can rely on their custom firmware that collects metrics, events, alarms, and alerts from the relevant hardware servers 202. The legacy software services 206 can then transmit the collected information to the virtual infrastructure manager 212.

The management and workload VMs 210 can include one or more VMs dedicated to managing the workloads of various VMs and associated operating in the SDDC. For example, the management and workload VMs 210 can track the number of VMs on a particular host, the memory and computing utilization of the host, license utilization for the host, and any other metrics associated with the VMs operating in the SDDC. The management and workload VMs 210 can provide information to the virtual infrastructure manager 212 and can carry out instructions received from the virtual infrastructure manager 212. For example, the virtual infrastructure manager 212 can instruct the management and workload VMs 210 to rebalance a set of VMs.

The virtual infrastructure manager 212 can provide any collected information to both a virtual rack manager 218 and SDDC services 216. In some examples, the virtual infrastructure manager 212 can store information at a storage location 220 accessible to both the virtual rack manager 218 and SDDC services 216. The virtual rack manager 218 can run on a cluster of server 202 nodes, in one example. In one example, the virtual rack manager 218 can use a management kernel to communicate with the servers 202 through one or more spine switches. The virtual rack manager 218 can instruct the virtual infrastructure manager 212 to perform management operations on hardware associated with the servers 202. For example, the virtual rack manager 218 can instruct the virtual infrastructure manager 212 to restart a server or switch.

The SDDC services 216 can be part of, or utilized by, an SDDC manager. The SDDC manager can be a hybrid cloud platform such as VMWARE's CLOUD FOUNDATION, for example. The SDDC manager can provide integrated cloud infrastructure, including compute, storage, networking, and security, and cloud management services to run applications in private and public environments. The SDDC services 216 can be used to collect information from the hardware servers and switches (Top of the Rack(ToR) Switches, Spine Switches, Management Switches) 202 that would otherwise not be collected by the virtual infrastructure manager 212. For example, as mentioned above, the virtual infrastructure manager 212 might not be able to view or detect hardware-level events, alerts, or alarms generated by the servers and switches 202. In that example, one or more SDDC service 216 can detect these hardware-level events and provide them to the serviceability module 222.

The serviceability module 222 can collect all metrics, events, alerts, and alarms from both the virtual infrastructure manager 212 and the SDDC services 216 and perform various operations based on the collected information. The serviceability module 222 can include a serviceability plugin interface 224 that provides a partner entity 240, 250 with one or more interfaces to customize a wide variety of features and options. For example, the serviceability plugin interface 224 can include a configuration interface 226, data interface 228, and operations interface 230, all of which can be made accessible to one or more partner entities 240, 250.

The configuration interface 226 can allow a partner entity 240, 250 to configure the serviceability module 222 in various ways. For example, a partner entity 240, 250 can utilize the configuration interface 226 to configure the partner-specific specification or format in which the partner wants to receive serviceability information. This includes, for example, the particular statistics, events, alerts, and alarms a partner entity wishes to receive from the serviceability module 222. As another example, the configuration interface 226 can be used to configure a partner-specific filtering to be done on the serviceability information. This can include, for example, filtering out non-critical alarms or alarms relating to a particular hardware unit. In another example, the configuration interface 226 can be used to configure a collection poll cycle time period for collecting serviceability information from different sources. The configuration interface 226 can also provide for configuration of collection rules and parameters for rules and machine-learning models to be implemented at an inference engine 234 (discussed in more detail later).

The data interface 228 can be an interface responsible for forwarded processed serviceability information to the relevant partner channel. For example, the data interface 228 can add metadata to the serviceability information (as discussed with respect to stage 140 of FIG. 1) and send the information in a batch to the partner entity 240, 250. If the data interface 228 is unable to reach a partner entity 240, 250, it can forward the metadata and serviceability information to a cloud storage service 280. It can also alert the partner entity 240, 250 regarding the failed transmission and provide identifying information for the cloud storage service 280 where the information is stored and retrievable by the partner entity 240, 250.

The operations interface 230 is an interface that can carry out executive functionalities on the SDDC 200 based on input from a partner entity 240, 250 or from the inference engine 234. In one example, an alert is received by the partner entity 240, 250 through the data interface 228, indicating that a firmware patch is incompatible with the virtual infrastructure manager 212 for a particular workload domain. The partner entity 240, 250 can determine that a new patch version would solve the issue. The partner entity 240, 250 can then utilize the operations interface 230 to trigger the necessary patch upgrade, which can cause the required commands to be provided to the SDDC manager to implement. As another example, the operations interface 230 can be utilized to recover from issues or fault conditions. For example, if an alert indicates that the hardware management service 208 is not running, the operations interface 230 can be used to transmit a command to the virtual rack manager 218 to start or restart the hardware management service 208.

The serviceability module 222 can also include a serviceability telemetry processor 232 that includes various components for collecting, filtering, and translating serviceability information originating from the virtual infrastructure manager 212 or SDDC manager. These components of the serviceability telemetry processor 232 are depicted and discussed in more detail with respect to FIG. 3.

The serviceability module 222 can also include an inference engine 234, as mentioned above. The inference engine 234 can be a component that applies logical rules to information in order to deduce new information. The inference engine 234 can apply these logical rules to any serviceability information gathered from the SDDC 200. The logical rules applied by the inference engine 234 can be provided by a partner entity 240, 250, causing the inference engine 234 to apply those custom rules to information that is relevant to the particular partner entity 240, 250 that provided the rules.

A partner entity 240, 250 can create custom rules for the inference engine 234 for various types of actions. Custom rules can affect the generation of statistics, such as by defining the triggering events that cause a particular statistic to be generated. For example, a custom rule can specify that an indication of normal operation need not generate a statistic for further processing. In other examples, custom rules can be directed to rules for the collection of information (such as events, alarms, and alerts), filtering of information, clustering of information, correlations of information, classification of information. Custom rules can also be implemented for indicating a particular cloud storage service 280 or location where information should be sent when the partner site is unavailable. The rules can further specify the generation of an alert regarding the downtime of the partner site and the respective destination of the information that was not successfully transmitted.

In another example, the inference engine 234 can utilize partner-specified rules to predict the particular partner site to which a data transmission should be directed. For example, the inference engine 234 can create a telemetry processor workflow based on the particular partner plugins 246, 256 registered at the serviceability module 222. In one example, a partner support service 244, 254 determines that it wants to receive notifications regarding a set of virtual infrastructure manager alarms. The partner support service 244, 254 can provide communication endpoints such as Uniform Resource Locators ("URLs"), Internet Protocol ("IP") address, ports, and so on.

While the inference engine 234 can utilize static rules, it can also perform machine-learning processes as specified by one or more rules. For example, a partner entity 240, 250 can push a machine-learning model at the configuration interface 226 for use by the inference engine 234. In one example, the machine-learning model can be applied to determine new issues that have not yet produced an expected event, alert, or alarm. In another example, the machine-learning model can be applied to predict the partner site to which a data transmission should be directed when there is not a static rule to make such a determination. For example, a first static rule can indicate that alerts from components A1, A2, and A3 should be provided to a first partner entity 240, which alerts from components B1, B2, and B3 should be provided to a second partner entity 250. When an alert is received from component A4, a machine-learning model can be applied to predict that the alert should be provided to the first partner entity 240 based on the patterns set forth in the static rules. This example is simplified for the sake of explanation. The machine-learning models need not be limited to examining other static rules, but instead can examine any information made available to it by the serviceability module 222.

The serviceability module 222 can also include a scheduler 236 that is responsible for triggering a serviceability telemetry processor workflow. For example, when an event, alert, or alarm is received at the serviceability module 222, the scheduler 236 can spawn a serviceability telemetry processor workflow that includes a particular poll cycle, a collection step, a filtering step, and a translation step. The scheduler 236 and serviceability telemetry processor workflow are described in more detail with respect to FIG. 3.

The serviceability module 222 can transmit information through a network 238, such as the Internet, to various destinations. In some examples, the information can be transmitted to a partner entity 240, 250. The partner entity 240, 250 might be responsible for troubleshooting issues associated with hardware components of the SDDC 200, for example. A partner entity 240, 250 can utilize a partner plugin 246, 256 that allows the data interface 228 of the serviceability module 222 to connect to the partner site and transmit or receive information to or from the partner site. A partner entity 240, 250 can also include a partner support service 244, 254 that examines incoming information and provides instructions, solutions, or other support to the SDDC 200. The partner support services 244, 254 can include one or more partner support people 242, 252.

The serviceability module 222 can also transmit information to a cloud analytics service 260. The cloud analytics service 260 can be utilized to analyze information before it is sent to a partner entity 240, 250. The cloud analytics service 260 can be used to build a knowledge base regarding any components of the SDDC 200 or implementations of a partner entity 240. An example cloud analytics service 260 is the VMWARE ANALYTICS CLOUD, although other cloud analytics services can be used as well. The cloud analytics service 260 can include a plugin 264 for transmitting information as well as the analytics service 262.

Additionally, the serviceability module 222 can transmit information to a multi-site SDDC management location 270. The multi-site SDDC management location 270 can include a plugin 274 for interfacing with the serviceability module 222 as well as a management component 272. The serviceability module 222 can transmit information to the multi-site SDDC management location 270 regardless of whether the information is transmitted to a partner entity 240, 250, cloud storage service 280, or cloud analytics service 260. The multi-site SDDC management location 270 can be used to gather information from multiple SDDCs 200 and manage them at one location, even where the SDDCs 200 are implemented in disparate locations.

FIG. 3 provides an example system diagram of the serviceability module 222 discussed in FIG. 2. As shown in the drawing and explained with respect to FIG. 2, the serviceability module 222 can communicate with a partner site through any of three interfaces: the data interface 228, the configuration interface 226, and the operations interface 230. A partner entity 240, 250 can utilize the configuration interface 226 to customize the serviceability module 222 to suit the partner's particular needs. For example, a partner entity can submit, through the configuration interface 226, configuration instructions regarding a partner-specific specification or format in which they want to receive serviceability information. The configuration instructions can apply to any of the collecting, filtering, and translating stages performed by the serviceability module 222. The configuration instructions can also apply to the inference engine 234, such as by providing static rules or machine-learning models to be utilized by the inference engine 234.

The configuration instructions can be gathered by a configuration controller 302. The configuration controller 302 can be a component of the configuration interface 226 in one example. In another example, the configuration controller 302 is a portion of the serviceability module 222 but operates as a process separate from the configuration interface 226. The configuration controller 302 can collect any instructions received through the configuration interface 226 and provide them to a configuration service 304.

The configuration service 304 can interpret the configuration instructions collected by the configuration controller 302 and format the configuration instructions in a manner suitable for providing to other components of the serviceability module 222. For example, the configuration service 304 can receive an instruction to create a static rule specifying that events, alerts, and alarms from a particular hardware device should be ignored for the next 30 minutes. The configuration service 304 can generate an instruction for the inference engine 234, using a format understood by the inference engine 234, and then forward the formatted instructions to the inference engine 234 to be implemented.

The configuration service 304 can also save configuration information to a database 310 that is accessible to components within the serviceability module 222. The configuration information in the database 310 can be used by other components of the serviceability module 222, such as a filter 318, 328 or collector 316, 326, as needed. The components of the serviceability module 222 can access the database 310 whenever configuration information is required, such as when the scheduler 236 launches a workflow that implicates a configuration saved in the database 310.

Like the configuration interface 226, the operations interface 230 can include an operations controller 306 and an operations service 308. The operations controller 206 can receive operations information provided by a partner site through the operations interface 230. For example, a partner entity 240, 250 can provide a patch upgrade intended to solve an issue with a previous patch. The patch can be uploaded through the operations interface 230 with instructions to install the patch on firmware associated with a hardware unit. The operations controller 306 can gather the patch and installation instructions and provide it to the operations service 308.

In addition to receiving operations information through the operations interface 230, the operations controller 306 can also receive operations information from the inference engine 234. For example, the inference engine 234 can use a machine-learning model to predict that a patch should be applied to the firmware of a particular hardware unit. Expanding on that example, a previous issue with a first hardware unit may have been solved by a partner entity 240, 250 providing a patch update specific to the first hardware unit. When the same issue arises with a second hardware unit that is associated with the same partner entity 240, 250, the inference engine 234 can use a machine-learning model provided by that partner entity 240, 250 to determine that a similar patch should be applied to the second hardware unit. Certain aspects of the patch can be changed to suit the second hardware unit, such as by updating identification information calling out the second hardware unit. The inference engine 234 can generate the instructions, and in some examples the patch itself, and provide one or both items to the operations controller 306. The operations controller 306 can receive these items and provide them to the operations service 308 for execution.

Regardless of the upstream source of the instructions, the operations service 308 can receive instructions from the operations controller 306, format them, and deliver them to the SDDC manager 314. The operations service 308 can utilize an API call, such as a representational state transfer ("REST") API call, that causes the SDDC manager 314 to retrieve the formatted instructions and carry them out accordingly. For example, the SDDC manager 314 can instruct the virtual rack manager 218 or hardware management service 208 to install a custom patch to the firmware of a hardware unit.

The inference engine 234 can also apply rules that dictate the actions of a scheduler 236. The scheduler 236 can responsible for triggering a serviceability telemetry processor workflow. For example, when an event, alert, or alarm is received at the serviceability module 222, the scheduler 236 can spawn a serviceability telemetry processor workflow that includes a particular poll cycle, a collection step, a filtering step, and a translation step. The inference engine 234 can provide rules for determining when to spawn a serviceability telemetry processor workflow, determining a poll time to apply to the collection step of the workflow, determine whether to involve the SDDC manager 314 or virtual infrastructure manager 212 in the workflow, and any other variables related to generating a workflow.

In the example of FIG. 3, the scheduler 236 has spawned two serviceability telemetry processor workflows—one based on information from the SDDC manager 314 and one based on information from the virtual infrastructure manager 212. The scheduler 236 can determine the type of workflow based on the event, alert, alarm, or rule triggering the workflow. For example, if an alert is received from the SDDC services 216 indicating a hardware failure, the scheduler 236 can apply a rule (provided by the inference engine 234 in some examples) to spawn a workflow that includes the SDDC manager 314. Similarly, if an alarm is received from the virtual infrastructure manager 212, the scheduler 236 can apply a rule to spawn a workflow that includes the virtual infrastructure manager 212. The scheduler can set poll times based on the specific workflow. In one example, the hardware management service 208 uses a poll time of 10 minutes, so a workflow involving the hardware management service 208 can include the SDDC manager 314 and use a poll time of 10 minutes.

Each workflow spawned by the scheduler 236 can include implementations of a collector 316, 326, filter 318, 328, and translator 320, 330. The particular implementations can be based on the source of the triggering event, alarm, or alert. For example, an alert originating from the SDDC services 216 can spawn a workflow that involves the SDDC manager 314 and utilizes a collector 316 tailored to collecting information from the SDDC services 216 and hardware management service 208, such as by using a REST API interface to poll alerts. Similarly, an alert originating from the virtual infrastructure manager 212 can spawn a workflow that utilizes a collector 326 tailored to collecting information from the virtual infrastructure manager 212. For example, the collector 326 can use a virtual infrastructure API such as the vSPHERE API to poll alarms.

The collectors 316, 326 can route the collected events, alarms, and alerts to the respective output pipelines. The output pipelines can be different for each distinct combination of source and endpoint. The output pipelines can include, for example, filters 318, 328 and translators 320, 330. A partner entity 240, 250 can specify a particular collector to use for particular events, alarms, and alerts, by providing the required information through the configuration interface 226. In that example, when a workflow is spawned by the scheduler, the collector 316, 326 can be selected based on configuration information stored in the configuration database 310.

The collector 316, 326 can provide the collected events, alarms, and alerts to an appropriate filter 318, 328. The filter 318, 328 can perform a filtering process on the collected information, removing any information that is not suitable for the partner entity 240, 250 relevant to the workflow pipeline. The filter 318, 328 can perform the filtering by, for example, applying configuration rules stores in the database 310 associated with the relevant partner entity 240, 250. The configuration rules can be stored in the database 310 as a result of receiving the configuration rules through the configuration interface 226, as described earlier. The filter 318, 328 can also perform the filtering based on rules inherent to the filter 318, 328, such as removing duplicate events, alerts, and alarms. The filter 318, 328 can further remove any information that applies to other partner entities 240, 250 rather than one of interest for the particular workflow process.

After performing the filtering operation, the filter 318, 328 can provide the filtered information to the relevant translator 320, 330 in the workflow process. As explained with respect to FIG. 1, each partner entity 240, 250 can specify a particular format for data-center information it receives. For example, a partner entity 240, 250 can specify that the data-center information should be formatted to include a field specifying the component at issue, followed by a field specifying the type of event, alarm, or alert relevant to that component, followed by the specifications of that component, and so on. A partner entity 240, 250 can provide formatting instructions through the configuration interface 226, which can be processed by the configuration controller 302 and configuration service 304 before being stored in the configuration database 310. The translator 320, 330 can therefore access the configuration database 310 and retrieve the relevant translation instructions required for a particular partner entity 240, 250.

After carrying out the relevant translation instructions, the translator 320, 330 can provide the translated data-center information to the data interface 228. The data interface 228 can package the information into a batch and generate any necessary metadata associated with the translated data-center information to prepare it for transmission to the partner entity 240, 250. This can include, for example, generating metadata indicating the dates and times covered by the data-center information, the filtering or translating rules applied to the data-center information, or any other relevant information describing the translated data-center information. The data interface 228 can then transmit the information a partner entity 240, 250, cloud storage service 280, cloud analytics service 260, multi-site SDDC management location 270, or some combination thereof.

The data interface 228 can provide collection metadata to the configuration database 310, allowing the database 310 to keep a complete record of serviceability. The collection metadata can provide information sufficient to determine the continuity or sequence of the telemetry data processed by the serviceability module 222. The collection metadata can include, for example, a collection timestamp that indicates the time that a particular set of data was collected and successfully published to the partner site. This can be used to identify any unpublished data from a previous poll cycle, for example.

The serviceability module 222 can implement solutions or perform maintenance procedures with respect to one or more components of the overall SDDC 200 system. The solutions or maintenance can include, for example, a software or firmware update of a component, replacement of a customer-replaceable unit such as a hard disk, solid-state drive, or power unit, replacement of a field-replaceable unit such as a server, CPU, or memory, a workload domain delete operation, or a cluster delete operation.

When these solutions or maintenance procedures are occurring, the particular component can produce additional events, alerts, or alarms by virtue of being shut down, restarted, changed, or otherwise affected by the procedure. These events, alerts, and alarms can be considered redundant or irrelevant, as they are produced in connection with a planned improvement, fix, or upgrade. The serviceability module 222 can "mute" the affected component while work (solution or maintenance) on the component is ongoing.

In one example, the serviceability module 222 mutes the relevant component by instructing the virtual infrastructure manager 212 or hardware management service 208 to ignore events, alerts, and alarms generated by the relevant component for a predetermined period of time, or until instructed otherwise. In another example, the component is muted by a rule disabling collection of events, alerts, and alarms by the collector 316, 326 during the relevant time period. Similarly, in another example, the component can be muted by a rule requiring the filter 318, 328 to filter out any events, alerts, and alarms originating from the component during the relevant time period. The muting process can apply to any component, such as a deployment, domain, cluster, host, server, or other component.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as exemplary only, with a true scope and spirit of the disclosure being indicated by the following claims.

What is claimed is:

1. A method for providing dynamic serviceability for a software-defined data center (SDDC) to a partner entity, comprising:
    collecting data-center information from a management service that monitors at least a portion of the SDDC;
    filtering the data-center information based on a stored list of metrics;
    translating the filtered data-center information into a partner-specific format requested by the partner entity;
    generating metadata associated with the translated data-center information;
    attempting to transmit the metadata and translated data-center information to a partner site associated with the partner entity;
    in response to the attempted transmission failing, forwarding, across a network, the metadata and translated data-center information to a partner-accessible storage location located remotely from the SDDC; and providing, to the partner entity, identifying information for the metadata and translated data-center information stored at the partner-accessible storage location, wherein the identifying information allows the partner entity to retrieve the stored metadata and translated data-center information from the partner-accessible storage location.

2. The method of claim 1, further comprising: in response to determining that the partner site has recovered, generating an alert regarding downtime of the partner site.

3. The method of claim 1, wherein the stored list of metrics is provided by the partner entity through a configuration interface and stored in a configuration database.

4. The method of claim 1, wherein the method is performed based on at least one rule supplied by the partner entity through a configuration interface and enforced by an inference engine.

5. The method of claim 1, wherein collecting data-center metrics is performed according to a poll time, and wherein the poll time is dynamically set by an inference engine based on settings provided by the partner entity.

6. The method of claim 1, further comprising:
receiving a response from the partner entity through a serviceability operations interface; and
implementing a solution at the SDDC, based on the received response, without manual intervention,
wherein the solution is implemented automatically based on the inference engine detecting the problem at the SDDC and executing one or more rules provided by the partner entity through the serviceability operations interface.

7. The method of claim 6, wherein implementing the solution further comprises: identifying a component that requires the solution; and
disabling the collecting of metrics from the component until the solution is implemented.

8. A non-transitory, computer-readable medium comprising instructions that, when executed by a processor of a computing device, cause the processor to perform stages for providing dynamic serviceability for a software-defined data center (SDDC) to a partner entity, the stages comprising:
collecting data-center information from a management service that monitors at least a portion of the SDDC;
filtering the data-center information based on a stored list of metrics;
translating the filtered data-center information into a partner-specific format requested by the partner entity;
generating new metadata based on the translated data-center information;
attempting to transmit the metadata and translated data-center information to a partner site associated with the partner entity;
in response to the attempted transmission failing, forwarding, across a network, the metadata and translated data-center information to a partner-accessible storage location located remotely from the SDDC; and
providing, to the partner entity, identifying information for the metadata and translated data-center information stored at the partner-accessible storage location, wherein the identifying information allows the partner entity to retrieve the stored metadata and translated data-center information from the partner-accessible storage location.

9. The non-transitory, computer-readable medium of claim 8, the stages further comprising:

in response to determining that the partner site has recovered, generating an alert regarding downtime of the partner site.

10. The non-transitory, computer-readable medium of claim 8, wherein the stored list of metrics is provided by the partner entity through a configuration interface and stored in a configuration database.

11. The non-transitory, computer-readable medium of claim 8, wherein the stages are performed based on at least one rule supplied by the partner entity through a configuration interface and enforced by an inference engine.

12. The non-transitory, computer-readable medium of claim 8, wherein collecting data-center metrics is performed according to a poll time, and wherein the poll time is dynamically set by an inference engine based on settings provided by the partner entity.

13. The non-transitory, computer-readable medium of claim 8, the stages further comprising:
receiving a response from the partner entity through a serviceability operations interface; and
implementing a solution at the SDDC, based on the received response, without manual intervention,
wherein the solution is implemented automatically based on the inference engine detecting the problem at the SDDC and executing one or more rules provided by the partner entity through the serviceability operations interface.

14. The non-transitory, computer-readable medium of claim 13, wherein implementing the solution further comprises:
identifying a component that requires the solution; and
disabling the collecting of metrics from the component while the solution is being implemented.

15. A system for providing dynamic serviceability for a software-defined data center (SDDC) to a partner entity, comprising:
a memory storage including a non-transitory, computer-readable medium comprising instructions; and
a computing device including a processor that executes the instructions to carry out stages comprising:
collecting data-center information from a management service that monitors at least a portion of the SDDC;
filtering the data-center information based on a stored list of metrics;
translating the filtered data-center information into a partner-specific format requested by the partner entity;
generating metadata associated with the translated data-center information;
attempting to transmit the metadata and translated data-center information to a partner site associated with the partner entity;
in response to the attempted transmission failing, forwarding, across a network, the metadata and translated data-center information to a partner-accessible storage location located remotely from the SDDC; and
providing, to the partner entity, identifying information for the metadata and translated data-center information stored at the partner-accessible storage location, wherein the identifying information allows the partner entity to retrieve the stored metadata and translated data-center information from the partner-accessible storage location.

16. The system of claim 15, the stages further comprising:
in response to determining that the partner site has recovered, generating an alert regarding downtime of the partner site.

17. The system of claim 15, wherein the stored list of metrics is provided by the partner entity through a configuration interface and stored in a configuration database.

18. The system of claim 15, wherein the stages are performed based on at least one rule supplied by the partner entity through a configuration interface and enforced by an inference engine.

19. The system of claim 15, wherein collecting datacenter metrics is performed according to a poll time, and wherein the poll time is dynamically set by an inference engine based on settings provided by the partner entity.

20. The system of claim 15, the stages further comprising:
- receiving a response from the partner entity through a serviceability operations interface; and
- implementing a solution at the SDDC, based on the received response, without manual intervention,
- wherein the solution is implemented automatically based on the inference engine detecting the problem at the SDDC and executing one or more rules provided by the partner entity through the serviceability operations interface.

\* \* \* \* \*